Nov. 5, 1940. C. A. PIERCY 2,220,728
MEANS FOR CONTROLLING LIQUID PRESSURE IN RISER CABLES
Filed April 4, 1939
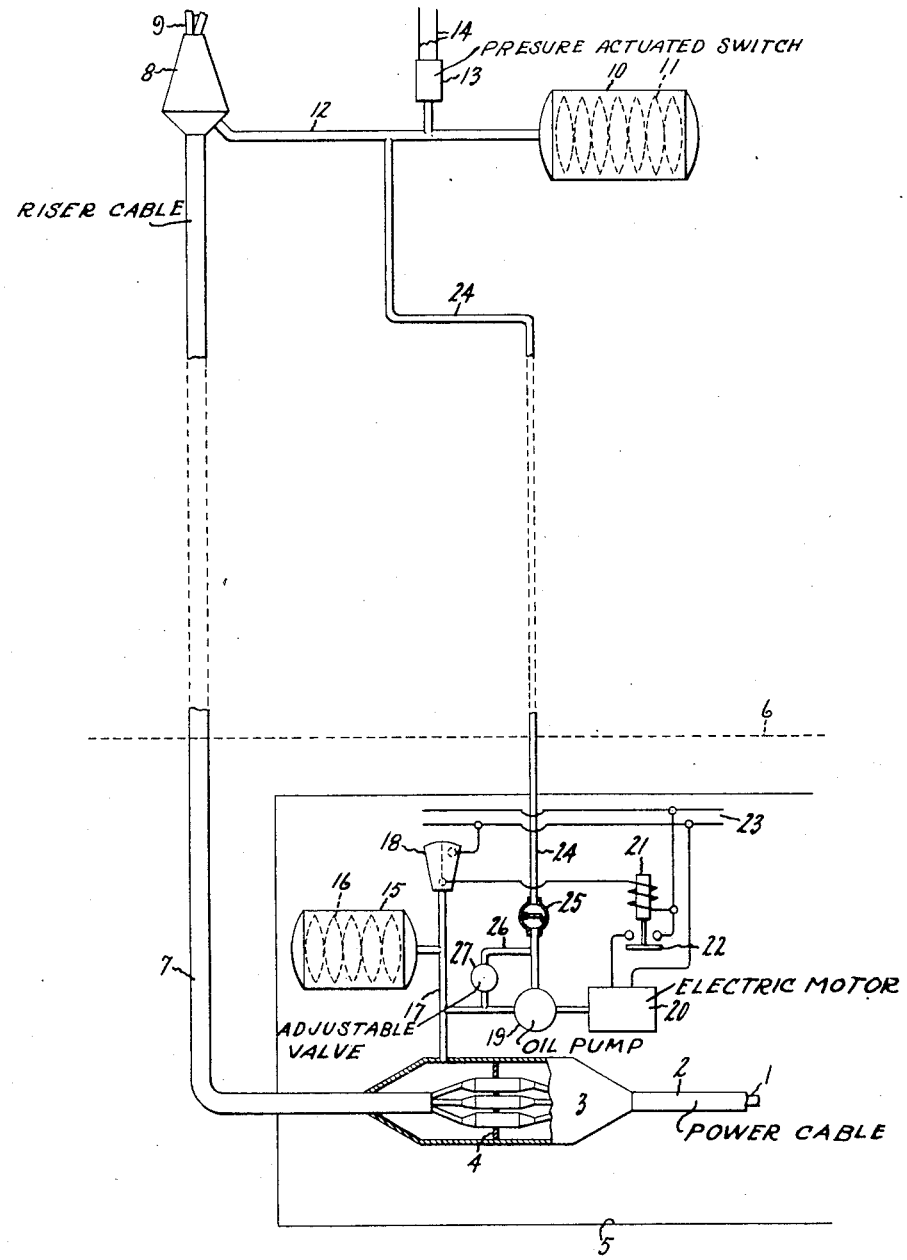
Inventor:
Carl A. Piercy,
by Harry E. Dunham
His Attorney.

Patented Nov. 5, 1940

2,220,728

UNITED STATES PATENT OFFICE 2,220,728

MEANS FOR CONTROLLING LIQUID PRESSURE IN RISER CABLES

Carl A. Piercy, Ballston Lake, N. Y., assignor to General Electric Company, a corporation of New York Application April 4, 1939, Serial No. 265,986

2 Claims. (Cl. 174—11)

In cable installations, there are so-called riser cables at one or both ends of the power transmitting cables, the latter being located below the level of the earth's surface, and it is through the riser cables that connections are made to overhead lines or to electrical apparatus receiving current from the power cable. The riser cables are of the type having insulation on the conductors which is impregnated with a relatively heavy oily compound of such character that when heated, it may slowly migrate from the top thereof to the bottom. Such cables are commonly referred to as solid type cables and may be located in the open or they may be located inside of power station buildings. Such cables commonly extend vertically a good many feet above the level of the power cable and at the top are provided with terminals each containing a chamber. Because of the height of the top of the cable, there is considerable hydrostatic pressure exerted on the oily compound which as it softens, due to heating, may migrate or move slowly downward with the result of leaving dry spots in the insulation at the upper part of the cable and unduly increasing the pressure on the lead sheath at the lower part of the cable. To prevent the formation of dry spots, reservoirs may be employed continuously to supply a comparatively thin oil to the chamber of the terminal from which it moves downwardly through the cable insulation at a low rate. To take care of the downward movement or migration of the compound and oil from the insulation and to prevent excess pressure at the lower end of the riser, a second reservoir may be employed and located near the bottom thereof. Under these conditions, there is a constant tendency toward depletion or emptying of the upper reservoir and a corresponding filling of the lower reservoir accompanied by an increase of pressure therein. To prevent the liquid from the riser entering or affecting the power cable, a stop joint is provided between the two. Because of the downward movement of the compound and oil, which for convenience may be termed leakage, it is necessary to make frequent inspections and also to prevent loss of the oil by removing it from the lower reservoir and returning it to the upper. This means opening the manhole and climbing ladders, first to the street level and then to the location of the upper reservoirs. Such leakage is more noticeable at the start of the installation than after the cables have been in operation for some time. It is not uncommon during the early stages of operation to transfer liquid from the lower to the upper reservoir as often as once or twice a day.

My invention has for its object to provide in a cable installation of the kind referred to a means for automatically and positively transferring insulating liquid, due to migration or leakage, from the lower to the upper reservoir servicing the riser cable to the end that the proper balance of fluid pressures may be preserved and thus avoid the necessity of frequent inspections and the manual labor of transferring liquid from one reservoir to the other.

For a consideration of what I believe to be novel and my invention, attention is directed to the accompanying description and the claims appended thereto.

In the drawing, 1 indicates a power cable which may be installed in ducts below the level of the street or buried in the soil. It may be of the usual type having one or more insulated conductors with an impervious sheath 2. 3 indicates a stop joint for electrically uniting the ends of adjacent conductors of the riser and power cables and also preventing the passage of oil or other insulating liquid from the riser into the power cable. A partition 4 is provided within the joint casing which prevents the flow of liquid from one cable to the other. 5 indicates in plan view certain walls of a manhole. The dotted line 6 indicates the level of the street or earth's surface. 7 indicates the riser cable which extends many feet above the level of the earth's surface. It is of the kind usually known as solid type cable in which the conductors are insulated in any of the usual ways and encased in a lead sheath. In the spaces between conductors are fillers of insulating material also of the usual type. All of the insulating material is impregnated with an oily compound. At the upper end of the cable is a terminal 8 of any usual or suitable construction having a chamber containing insulating liquid, such as oil. To prevent dry spots in the conductor insulation due to drainage therefrom of the compound and the formation of voids within the sheath, the cable 7 is supplied with relatively thin oil from the terminal 8. Overhead lines 9 are connected to the cable 7 in the usual manner.

10 indicates a reservoir of the type comprising a rigid wall tank containing a plurality of cells 11, each having thin elastic walls. The cells, if desired, may contain gas under positive pressure so as to exert pressure on the oil in which they are submerged. The tank is suitably connected to the terminal by a pipe 12 through which oil is free to flow. 13 represents a pressure indicator and switch with circuit wires 14 connected thereto and leading to a selected station; the purpose thereof being to indicate any abnormal pressure condition either above or below normal.

Oil tends to migrate, seep, or leak from the terminal 8 and riser cable 7 into the casing of the stop joint 4. This leakage is usually greater when the cables are first installed than later on. Because of the elevation of the terminal, there is a considerable hydrostatic head on the oil at all times tending to deplete through leakage the supply in the chamber of the insulator. As oil is lost from the terminal and raiser cable 7, the pressure within the casing of the stop joint builds up, the loss of oil in the riser and terminal being automatically taken care or by the reservoir 10 due to its position, to the elasticity of the walls of the cell 11 or to both.

Referring now more especially to the apparatus in the manhole, 15 indicates a reservoir comprising a rigid wall tank and numerous flexible wall cells 16. The tank is connected by a pipe 17 with a chamber of the stop joint, and the pressure of the oil therein changes, especially as oil leaks out of the riser cable. Such leakage causes a rise of pressure. Connected to the pipe 17 is a pressure actuated relay switch 18 which closes upon a predetermined rise of oil pressure and opens upon a predetermined decrease of pressure. The reservoirs are provided with the usual means for gaining access to the interior of the tank.

19 indicates an oil pump which is driven by a small electric motor 20. The circuit of the motor is controlled by a solenoid magnet 21, the latter being responsive to the switch 18. The core of the solenoid actuates a contact 22 in the motor circuit. In the position illustrated the circuit is open and is closed when the solenoid is energized. The supply circuits for the switch 18 and the motor 20 are indicated by reference character 23.

Extending from the pump 19 to the pipe 12 connecting the upper reservoir and terminal is a pipe or conduit 24 in which is located a check valve 25 that closes toward the pump to prevent the back flow of oil from the upper reservoir when the pump stops. 26 indicates a by-pass around the pump in which is located an adjustable valve 27 which opens when the pump pressure rises above the predetermined pressure of the system. The purpose of this arrangement is to prevent injury to the parts of the installation, especially those parts which are encased in lead.

As the oil leaks or seeps from the riser cable, the quantity in the upper reservoir decreases and the quantity in the lower reservoir correspondingly increases accompanied by a rise in pressure. When the predetermined limit is reached, relay switch 18 closes and the solenoid 21 closes the main motor switch 22 with the result that the motor starts and drives the pump, the latter delivering oil to the upper reservoir 10 through the pipe 24. This action continues until the pressure in the lower reservoir 16 and its connected piping decreases to the predetermined value when the relay switch 18 opens and also the motor switch 22. Should there be any appreciable lag in the operation resulting in an over-pressure, the by-pass value 27 will open, permitting the pump 19 to circulate on itself.

What I claim as new and desire to secure by Letters Patent of the United States, is:

1. A cable system comprising a power cable, and a vertically disposed riser cable containing a compound under hydrostatic head which drains by head pressure and gravity toward the lower end, both of said cables being sealed against the admission of air, a stop joint electrically connecting the cable conductors and preventing the passage of compound due to head pressure from the riser cable into the power cable, a chambered casing for the joint, one side of which is subjected to the head pressure of the riser cable and the other to the contents of the power cable, an elevated first reservoir sealed against the admission of air and containing thin liquid, a conduit connecting the elevated end of the riser cable and the reservoir through which liquid is free to flow, a second reservoir also sealed against the admission of air and connected to the riser side of the stop joint casing and receiving liquid therefrom, a pump connected to the riser side of the joint casing and receiving liquid therefrom, an electric motor for driving the pump, a conduit receiving liquid from the pump and delivering it to the elevated reservoir, and a switch responsive to the pressure conditions within the joint casing and the second reservoir for starting and stopping the motor and pump.

2. A cable system comprising a power cable, a vertically disposed riser cable containing a compound under hydrostatic head which drains by head pressure and gravity toward the lower end, the cable having a sheath preventing access of air to its contents and which is subject to injury due to the effects of said head pressure, a stop joint at the lower end of the riser cable for electrically connecting the two cables and preventing the compound under head pressure of the riser cable from affecting the power cable, an elevated first reservoir containing liquid under positive pressure which is sealed against the admission of air to the compound and has a yieldable element, a conduit connecting the elevated end of the riser cable and the reservoir through which liquid is free to flow, a second reservoir located near the bottom end of the riser cable which is sealed against the admission of air, is connected to the riser cable side of the stop joint casing to receive liquid therefrom and has a yieldable element therein, a pump connected to the riser cable side of the joint casing and receiving liquid therefrom, an electric motor for driving the pump, a conduit receiving liquid from the pump and delivering it to the elevated reservoir, and switch means responsive to the pressure conditions within the joint casing and the second reservoir for starting and stopping the motor and pump.

CARL A. PIERCY.